United States Patent

[11] 3,552,360

| [72] | Inventor | Floyd O. Nelson<br>P. O. Box 452; 118 Broad St., Sioux<br>Rapids, Iowa 50585 |
|---|---|---|
| [21] | Appl. No. | 783,670 |
| [22] | Filed | Dec. 13, 1968 |
| [45] | Patented | Jan. 5, 1971 |

[54] ANIMAL FEEDER
6 Claims, 6 Drawing Figs.

[52] U.S. Cl. .................................................. 119/53.5
[51] Int. Cl. ................................................... A01k 05/00
[50] Field of Search ......................................... 119/53, 53.5, 54

[56] References Cited
UNITED STATES PATENTS
| 1,524,619 | 1/1925 | Harrington | 119/53.5 |
| 1,719,245 | 7/1929 | Smidley | 119/53.5 |
| 2,494,950 | 1/1950 | Lee | 119/53.5 |
| 3,019,766 | 2/1962 | Pannier | 119/53.5 |

Primary Examiner—Hugh R. Chamblee
Attorney—Zarley, Mc Kee and Thomte

ABSTRACT: A device for holding and dispensing feed to animals in response to their agitation of a metering gate having agitation members carried thereon and extending inwardly and upwardly into the feed storage compartment. The metering gate is connected through an adjustable bracket to the end walls of the feeder for multidirectional adjustment. The metering gate is permitted limited longitudinal and pivotal movement to effect multidirectional agitation of the feed in the feeder.

PATENTED JAN 5 1971
3,552,360
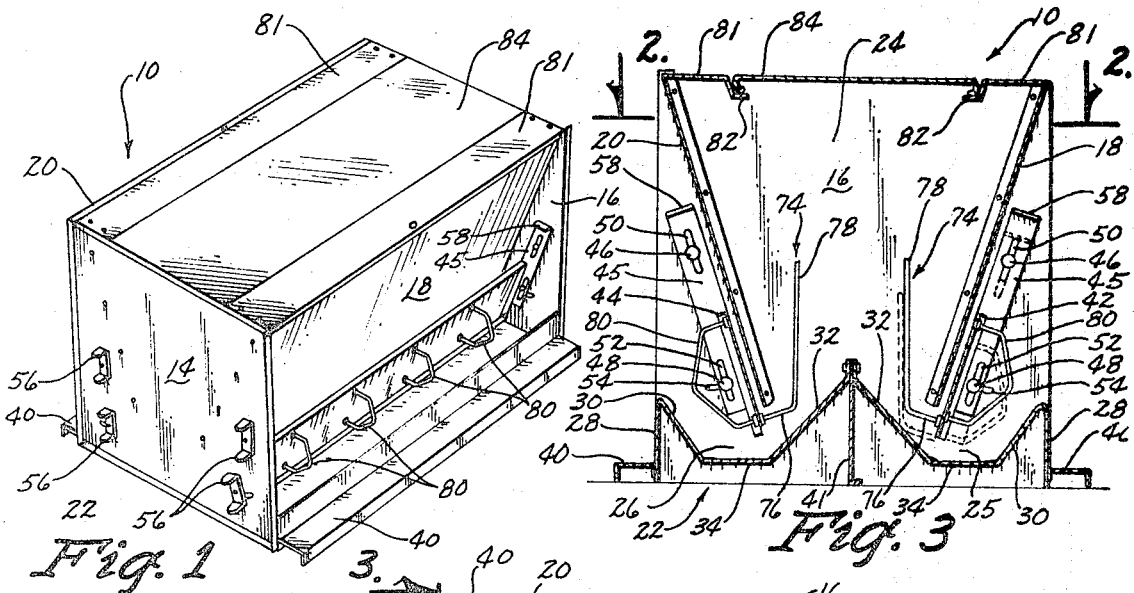
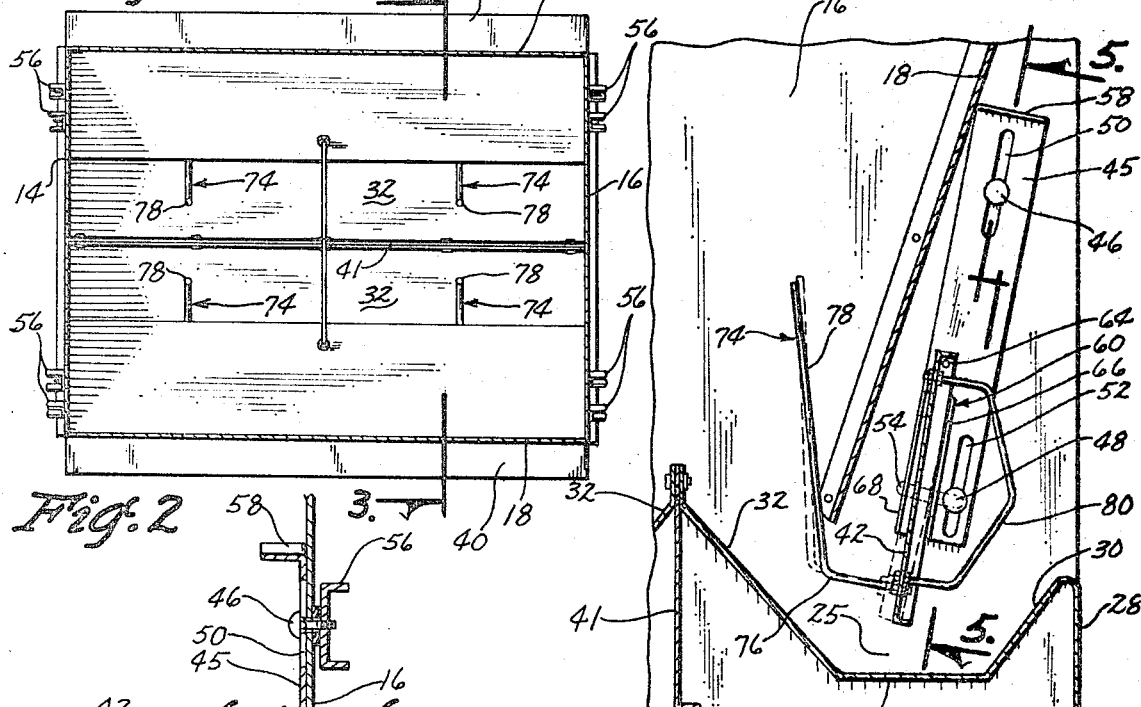
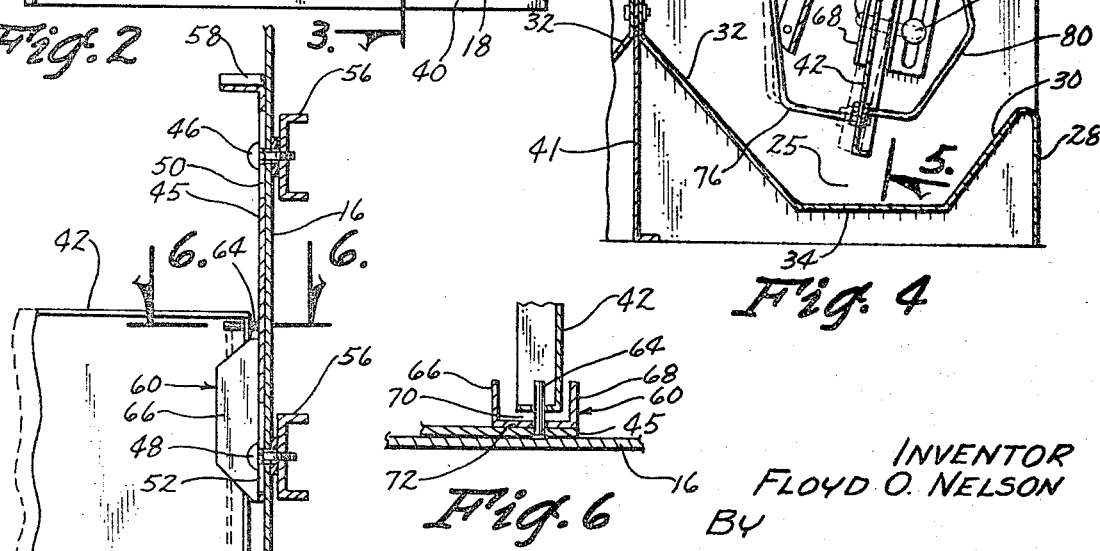
INVENTOR
FLOYD O. NELSON
BY
Zarley, McKee & Thomte
ATTORNEYS 3,552,360

ANIMAL FEEDER

A common problem with animal feeders is obtaining a continuous flow of feed to the feeding troughs of the feeders. The feed will tend to bridgeover inside the feeder. This bridgeover increases with the moisture content of the feed and also the finer the feed particles are ground the greater the bridgeover problem becomes.

This invention provides a simplified agitation means which is responsive to the feeding action resulting from animals eating at the feeder. The feeder is provided with a metering gate pivotally and longitudinally movable between the feeder end walls and exposed to animals feeding such that their contact with the gate will move the gate and thereby move the agitation means inside the feed compartment. The movement of the agitation means is multidirectional and thereby maximizes the agitation of the feed in the feed compartment with a minimum of gate movement.

The gate is pivotally mounted within a pair of channels at opposite ends thereof which in turn are adjustably secured for multidirectional movement relative to the end adjustable of the feeder. The side flanges of the channels limit the pivotal movement of the gate and the channels are spaced sufficiently outwardly from the ends of the gate to permit longitudinal movement of the gate between the channels.

These and other objects will be apparent to those skilled in the art.

This invention consists in the construction arrangements, and combination of the various parts of the device, whereby the objects contemplated are attained as hereinafter more fully set forth, specifically pointed out in the claims, and illustrated in the accompanying drawings in which:

FIG. 1 is a perspective view of the animal feeder of this invention;

FIG. 2 is a cross-sectional view taken along line 2–2 in FIG. 3;

FIG. 3 is a cross-sectional view taken along line 3–3 in FIG. 2;

FIG. 4 is an enlarged fragmentary cross-sectional view of the structure shown in FIG. 3;

FIG. 5 is a cross-sectional view taken along line 5–5 in FIG. 4; and

FIG. 6 is a cross-sectional view taken along line 6–6 in FIG. 5.

The feeder of this invention is referred to generally in FIG. 1 by the reference numeral 10 and includes opposite end walls 14 and 16 interconnected by opposite sidewalls 18 and 20 which cooperate with a bottom structure 22 to form therebetween a feed storage compartment 24 as seen in FIG. 3.

The bottom structure 22 includes identical sidewalls and bottom troughs 25 and 26. The troughs include outer vertical sidewall portions 28 which merge with inwardly and downwardly tapering sidewalls 30 and 32 which meet opposite sides of the bottom wall 34 of the respective troughs. A step 40 is provided for animals to step up and reach the feed in the trough 25 and 26.

An inner dividing wall 41 extends the length of the feeder then is bolted to the trough wall portions 32.

The sidewalls 18 and 20 extend downwardly and inwardly and terminate in spaced relationship above the bottoms of the trough 25 and 26 respectively. As seen in FIGS. 3 and 4 the sidewalls 18 are almost perpendicular to the trough wall portions 32.

Each of the sidewalls 18 and 20 have metering gates 42 and 44 respectively associated therewith and are identical in arrangement and construction. A mounting plate bracket 45 is secured to the end walls 14 and 16 through pins 46 and 48 extending through longitudinally extending slots 50 and 52. A transversely-extending, slightly arcuate slot 54 is formed in the end walls 14 and 16 to permit pivotal movement of the plates 44 about an axis through the pins 46. Hand operated nuts 56 and 58 are provided on the exterior of the end walls in engagement with the bolts 46 and 48 respectively such that adjustment from the exterior may be accomplished for the metering gates 42 and 44. The mounting plates 44 may be manually adjusted by gripping the inwardly extending portions 58 at the upper end thereof as seen in FIG. 5.

At the lower end of each of the mounting plates 44 channel-shaped elements 60 are fixedly secured thereto and nestingly receive opposite ends of the gates 42 and 44. A pivot pin 64 extends inwardly from each of the plates 45 and engages the gates on the end adjacent the top longitudinal edges. It is seen in FIG. 6 that the gates 42 and 44 are smaller in width that the distance between the side flanges 66 and 68 of the channel elements 60 and thus the gates may pivot a limited amount therebetween as indicated by the solid and dark line representations in FIG. 4. It is further seen that a space 70 is provided between the end of the gate 42 and the base 72 of the channel element 60 such that the gate 42 may move longitudinally between the channels as seen by the solid and dash line representations in FIG. 5.

An agitation rod 74 is carried on the gates 42 and 44 and includes an inwardly extending portion 76 terminating in a free upwardly extending portion 78 and thus the agitation element 74 moves as a unitary member with the gates 42 and 44. As seen in FIG. 2, each of the gates includes two oppositely disposed agitation rod elements 74.

The outer sides of the gates 42 and 44 include a series of guide guard rods 80 with their opposite ends bolted to the gates and thereby providing a series of feeding stations for the troughs 24 and 26. The animals, such as pigs, will be limited in their feeding at the troughs by the space provided between each pair of guides or rods 80. Furthermore engagement of the guards 80 will impart motion to the gates and cause agitation within the feed compartment 16 to maintain a continuous flow of feed into the feeding troughs 24 and 26.

It is seen in FIGS. 1 and 3 that a top structure is provided which includes horizontally disposed inwardly extending top flanges 81 having downwardly offset support edges 82 on which a removable top cover member 84 is supported.

Thus in operation it is seen that the gates are adjusted for height and closeness to the sidewalls 18 and 20 as is appropriate for the animals and the feed involved in the usage. An adjustment of the mounting plate 44 is accomplished by operation of the portion 58 in cooperation with the hand nuts 66. The agitation rods 74 extend under the sidewalls 18 and 20 and upwardly into the feeding compartment 16 and are free to move in multiple directions as the gates 42 and 44 move both longitudinally as seen in FIG. 5 and inwardly and outwardly as seen in FIG. 4. This will provide sufficient agitation to keep the feed in the compartment 24 freely flowing.

I claim:

1. An animal feeder, comprising:

an enclosure having opposite end walls and opposite sidewalls and a bottom structure defining a feed compartment;

a movable metering gate positioned to extend below the lower edge of one of said sidewalls and adjacent said bottom structure;

said bottom structure including a feeding trough under said gate and in communication with said feed compartment;

an agitation means operably connected to said metering gate and extending into said feed compartment for agitation of feed therein upon said gate being moved thereby maintaining the free flow of feed from said compartment and out past said gate;

said gate being positioned outwardly of said adjacent sidewalls in substantial overlapping relationship therewith and said agitation means being secured directly to said gate and extending under said adjacent sidewall and upwardly into said compartment;

said moveable metering gate including a lower side edge positioned over said feeding trough and adapted to be moved by animals engaging said gate while feeding at said trough;

connecting means being provided for pivotally connecting said gate at opposite ends to said opposite end walls; and said connecting means being positioned between said end walls and the ends of said gate such that said gate may move longitudinally back and forth between said end walls and thereby effect multidirectional movement of said agitation means in said compartment.

2. The structure of claim 1 wherein said connecting means include a pair of inwardly facing channels, one at each end of said gate and secured to the adjacent opposite end walls, said channels embracing the ends of said gate and having sufficient width for pivotal movement of said gate therein.

3. The structure of claim 2 wherein said gate is connected through said connecting means to said end walls for adjustable movement of said gate vertically, relative to said trough and inwardly and outwardly relative to said adjacent sidewalls.

4. The structure of claim 3 wherein said connecting means includes a plate element on the inner side of each end wall and having bolts connecting it to said sidewall through a pair of elongated longitudinally extending slots in each of said plates, said end walls having a transversely extending slot in alignment with the lowest elongated slot for pivotal movement of said gate about the axis of the top bolt, said channels being fixedly secured to said plates and said gate being pivotally connected adjacent its upper longitudinal edge to said plates, and tightening means engaging said bolts on the exterior of said end walls, said tightening means being exposed and thereby accessible for manual adjustment.

5. The structure of claim 1 wherein said agitation means include a plurality of independent rod members spaced apart along the length of said gate and each rod member having a first portion extending inwardly under said adjacent sidewalls and terminating in an upwardly extending free end portion.

6. The structure of claim 1 wherein stop means are provided on opposite sides of said gate to limit pivotal movement of said gate.